United States Patent
Kanonakis et al.

(10) Patent No.: US 9,609,400 B2
(45) Date of Patent: Mar. 28, 2017

(54) RECONFIGURABLE AND VARIABLE-RATE SHARED MULTI-TRANSPONDER ARCHITECTURE FOR FLEXIBLE ETHERNET-BASED OPTICAL NETWORKS

(71) Applicant: NEC Laboratories America, Inc., Princeton, NJ (US)

(72) Inventors: Konstantinos Kanonakis, New Brunswick, NJ (US); Junqiang Hu, Davis, CA (US); Ankitkumar Patel, Monmouth Junction, NJ (US); Philip Ji, Cranbury, NJ (US); Ting Wang, West Windsor, NJ (US)

(73) Assignee: NEC Corporation (JP)

( * ) Notice: Subject to any disclaimer, the term of this patent is extended or adjusted under 35 U.S.C. 154(b) by 67 days.

(21) Appl. No.: 14/465,122

(22) Filed: Aug. 21, 2014

(65) Prior Publication Data
US 2015/0055664 A1    Feb. 26, 2015

Related U.S. Application Data

(60) Provisional application No. 61/868,785, filed on Aug. 22, 2013.

(51) Int. Cl.
*H04Q 11/00* (2006.01)
*H04L 12/40* (2006.01)

(52) U.S. Cl.
CPC ....... *H04Q 11/00* (2013.01); *H04L 12/40136* (2013.01); *H04Q 2213/13103* (2013.01);
(Continued)

(58) Field of Classification Search
CPC ... G06F 5/06; G06F 5/16; H04L 12/66; H04L 12/40136; H04L 47/34; H04Q 11/00;
(Continued)

(56) References Cited

U.S. PATENT DOCUMENTS 6,731,875 B1 *   5/2004   Kartalopoulos ........ H04J 14/02
                                                              398/68
7,454,537 B1 *  11/2008   Xue .......................... G06F 5/06
                                                              710/52
(Continued)

FOREIGN PATENT DOCUMENTS

WO    WO2013012015 A1    1/2013

OTHER PUBLICATIONS http://www.ieee802.org/3/ba/—"IEEE Standard for Information Technology Telecommunications and Information Exchange Between Systems", Amendment 4, 2010, pp. 1-457.
(Continued)

*Primary Examiner* — Khoa Huynh
(74) *Attorney, Agent, or Firm* — Joseph Kolodka

(57) ABSTRACT

Systems and methods for data transport, including receiving one or more signals into a reconfigurable and flexible rate shared rate multi-transponder network architecture, wherein the network architecture includes one or more transponders with multiple line side interfaces and one or more client side interfaces. The transponders are configured to map one or more signals to multiple parallel Virtual Ethernet Links, remove idle characters from the one or more signals, buffer one or more blocks of characters using an intermediate block buffer, activate and deactivate one or more portions of input/output electrical lanes of an Ethernet module, multiplex and demultiplex the one or more signals to and from the input/output electrical lanes to enable sharing of a single optical transceiver by multiple independent signals, and insert blocks of idle characters to enable transmission over a lower rate transmission pipe.

17 Claims, 5 Drawing Sheets

(52) U.S. Cl.
CPC .............. *H04Q 2213/13292* (2013.01); *H04Q 2213/13389* (2013.01); *Y02B 60/31* (2013.01)

(58) Field of Classification Search
CPC .......... H04Q 2213/13103; H04Q 2213/13292; H04Q 2213/13389; Y02B 60/31; Y02B 60/33
See application file for complete search history.

(56) References Cited

U.S. PATENT DOCUMENTS

| | | | |
|---|---|---|---|
| 2008/0084828 A1* | 4/2008 | Gonzalez | H04L 12/66 370/252 |
| 2010/0158518 A1 | 6/2010 | Shin et al. | |
| 2011/0007664 A1 | 1/2011 | Diab et al. | |
| 2012/0155486 A1 | 6/2012 | Ahn et al. | |
| 2012/0251106 A1* | 10/2012 | Valiveti | H04L 47/34 398/45 |
| 2013/0012015 A1 | 1/2013 | Oh et al. | |

OTHER PUBLICATIONS

McKeown, et al., "OpenFlow: Enabling Innovation in Campus Networks", ACM SIGCOMM Computer Communication Review, Mar. 2008 pp. 69-74.

Han, et al., "Adaptive Data Transmission Control for Multilane-Based Ethernet." ETRI Journal, vol. 35., No. 1, Feb. 2013, pp. 146-149.

Han, Kyeong-Eun, et al. "An Energy Saving Scheme for Multilane-Based High-Speed Ethernet." ETRI Journal, vol. 34, No. 6, Dec. 2012, pp. 807-815.

Reviriego, et al., "Improving Energy Efficiency in IEEE 802.3 ba High-Rate Ethernet Optical Links." IEEE Journal of Selected Topics in Quantum Electronics, vol. 17., No. 2, Mar./Apr. 2011, pp. 419-427.

http://www.ieee802.org/3/az/—"IEEE Standard for Information Technology Telecommunications and Information Exchange Between Systems", Amendment 5, 2010, pp. 1-264.

Gunaratne, et al., "Reducing the Energy Consumption of Ethernet with Adaptive Link Rate (ALR)." IEEE Transactions on Computers, vol. 57., No. 4, Apr. 2008, pp. 448-461.

Gerstel, et al., "Elastic Optical Networking: A New Dawn for the Pptical Layer?," IEEE Communications Magazine, vol. 50., No. 2, Feb. 2012, pp. s12-s20.

Ohara, et al., "OTN Technology for Multi-flow Optical Transponder in Elastic 400G/1T Transmission Era," in Optical Fiber Communication Conference, OSA Technical Digest (Optical Society of America, Jan. 2012), paper JW2A.8, 3 pages.

http://standards.ieee.org/findstds/standard/802.1AX-2008.html, "IEEE Standard for Local and Metropolitan Area Networks", 2008, pp. 1-163.

* cited by examiner

RECONFIGURABLE AND VARIABLE-RATE SHARED MULTI-TRANSPONDER ARCHITECTURE FOR FLEXIBLE ETHERNET-BASED OPTICAL NETWORKS

RELATED APPLICATION INFORMATION

This application claims priority to provisional application Ser. No. 61/868,785 filed on Aug. 22, 2013, incorporated herein by reference.

BACKGROUND

Technical Field

The present invention relates to data transport, and more particularly, to data transport using reconfigurable and variable-rate shared flexible Ethernet transponder architecture.

Description of the Related Art

While originally designed for use in Local Area Networks (LAN), the Ethernet protocol specified with the IEEE 802.3 Ethernet Working Group has been significantly extended in scope in recent years. The main reason for that is the ubiquity of Ethernet and the resulting economies of scale for the associated interfaces and equipment (e.g. switches). Furthermore, using the same protocol throughout the network facilitates the interconnection with clients, since Ethernet is the dominant technology in the access and aggregation part of the network. As a result, a large number of Metropolitan Area Network MAN) deployments have already appeared which use either pure Ethernet or Multi-Protocol Label Switching (MPLS) over Ethernet for communication among their nodes, while some service providers could even deploy such networks from their long haul optical packet transport all the way to the aggregation and access segments. Of particular importance are also inter- and intra-data center networks, whereby very large amounts of data are distributed in a bursty manner, making Ethernet a very attractive option due to its packet-based nature.

In order to address the increased overall user traffic requirements, and especially under the prism of the aforementioned developments, the IEEE has been continuously standardizing updates of the Ethernet protocol to support higher rates. The current IEEE 802.3ba standard defines 40 Gb/s and 100 Gb/s rates. In both cases, a multi lane approach is followed, whereby the Ethernet, electrical bit-serial signal is split into multiple parallel lower-rate electrical lanes for performing most of the electrical processing, which are then bit-multiplexed into a smaller or equal number of electrical lanes that are fed to an optical transceiver. The latter can also perform further bit multiplexing, depending, on the number of physical (PRY) lanes it employs. The next generation of Ethernet beyond 100G is also expected to follow a multi-lane approach (in both electrical and optical domains) mainly due to inherent limitations in state-of-the-art electronic processing capabilities as well as single-carrier optical transmission at such high rates.

Despite the ever increasing flexibility at the line side of optical networks (for example via the use of Orthogonal Frequency Division Multiplexing (OFDM) and Nyquist Wavelength Division Multiplexing (WDM) technologies), the current case is that transponders providing the interconnection with Ethernet clients at the edge of the network would produce fixed rate signals at one of the standardized Ethernet rates. The fact that Ethernet rates are defined in a step-wise fashion (i.e., 10 Gb/s, 40 Gb/s, 100 Gb/s) makes this inefficiency even worse. Since sufficient traffic aggregation cannot always be ensured, this mismatch is expected to result in spectrum waste at the optical network side.

Furthermore, energy efficiency has become a very crucial requirement in all types of networks, since it has to be ensured that power consumption will scale well with the rapidly increasing amounts of traffic that need to be carried over them. The transponders discussed above will still operate at the full line rate, even when the actual client traffic they handle is lower, thus unnecessarily consuming energy for the electronic circuitry implementing the protocol and the accompanying transceiver modules. Furthermore, for each Ethernet, signal that needs to be sent at the edge of the network towards there should be a separate line side port. This implies additional cost and power consumption at disproportionate levels compared to the actual amount of traffic that needs to be transferred.

It is noted that the Software-Defined Networking (SDN) concept, which has emerged in recent years, allows separating the data and the control planes. In the context of as transport network controlled in an SDN manner, the benefits are multifold and include the reduction of manual processes across domains and layers, the possibility for cross-layer optimization schemes, faster connection establishment and teardown, reduction of overprovisioning and simplified management.

As discussed above, there are currently issues with, and there is to need for efficiently deploying Ethernet as a transport technology in high-capacity and flexible optical networks, including rate flexibility, energy efficiency, cost and spectrum utilization, and efficient network control and management; and there is presently no solution which addresses these issues effectively.

SUMMARY

A method for data transport. The method for data transport includes receiving one or more signals into a reconfigurable and flexible rate shared rate multi-transponder network architecture, wherein the network architecture includes one or more transponders with multiple line side interfaces and one or more client side interfaces. The one or more transponders are configured to map one car mote signals to multiple parallel Virtual Ethernet Links, remove idle characters from the one or more signals, buffer one or more blocks of characters using an intermediate block buffer, activate and deactivate one or more portions of input/output electrical lanes of an Ethernet module, multiplex and demultiplex the one or more signals to and from the input/output electrical lanes to enable sharing of a single optical transceiver by multiple independent signals, and insert blocks of idle characters to enable transmission over a lower rate transmission pipe.

A transmitter. The transmitter includes one or more transponders in a reconfigurable and flexible rate shared rate multi-transponder network architecture, wherein the one or more transponders includes multiple line side interfaces and one or more client side interfaces. The one or more transponders include one or more mappers configured to map one or more signals arriving from each of the one or more client side interfaces to a configurable number of Ethernet signals of adjustable rate towards the line side; one or more bit-serial interfaces to receive input, and one or more parallel serial interfaces to send output to electrical lanes; an idle character removal module configured to remove existing idle characters from the Ethernet, signals, and to send only useful blocks to active lanes in the electrical lanes; a buffer configured to distribute blocks of data in a round robin fashion, the buffer including an idle block insertion module configured to insert idle blocks when there are no blocks waiting in the buffer; and one or more scramblers or encoders configured to scramble or encode the signals before transmitting the signals.

A receiver. The receiver includes one or more transponders in a reconfigurable and flexible rate shared rate multi-transponder network architecture, wherein the one or more transponders includes multiple line side interfaces and one or more client side interfaces. The one or more transponders further include a receiving module configured to receive signals using active lanes from one or more electrical lanes; one or more demultiplexers configured to demultiplex the signals; one or more descramblers or decoders configured to descramble or decode the signals; and a buffer configured to receive descrambled or decoded signals, the buffer including a character insertion module configured to insert characters between successive Ethernet frames to maintain transport rate.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
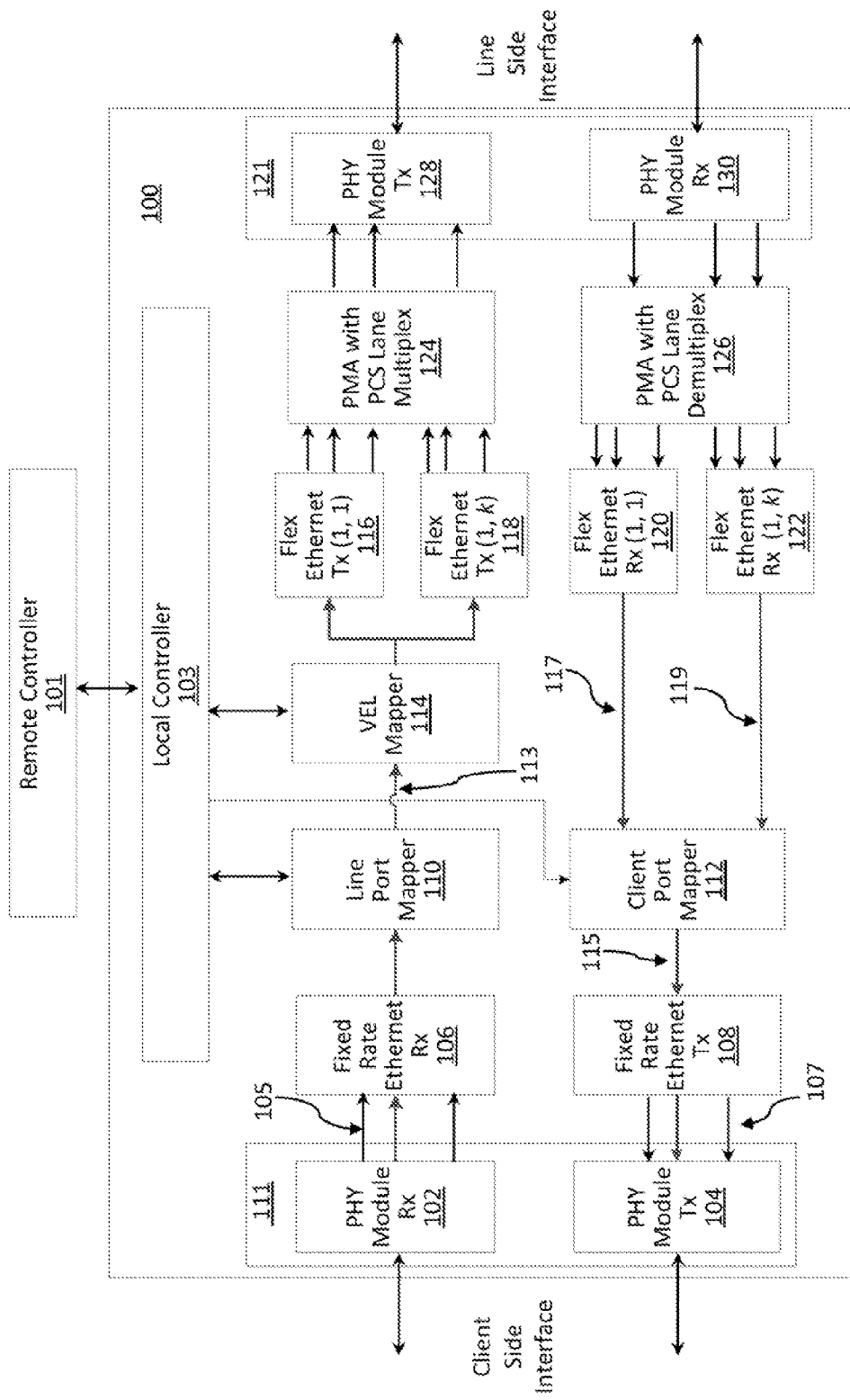
FIG. 1 is a block/flow diagram of a system and method for data transport using a Flex-Ethernet transponder in accordance with an exemplary embodiment of the present principles.

The system and method according to the present principles may employ a novel Flexible Ethernet (Flex-Ethernet) mechanism which, in one embodiment, may build upon the standardized 802.3ba protocol, and may enable operation at any rate, and also may enable sharing of a single optical transceiver module among Virtual Ethernet Links (VELs) in the optical domain. The system and method may be applied in the context of a novel Ethernet transponder architecture according to the present principles, which may include multiple client side and line side interfaces.

For interoperability purposes, the transponder can operate with clients equipped with standard Ethernet interfaces. The transponder may be centrally controlled in a Software Defined Networking (SDN) manner, so that end-to-end virtual VELs with the desired rates can be established according to the needs of the network operator. The system and method according to the present principles thus may create VELs which can transparently traverse, and may be flexibly switched across an optical network without requiring further electrical processing and switching.

The present principles may enable the sharing of a single optical transceiver module towards the line side by multiple Ethernet signals in parallel, and each of them may be carrying traffic from a different client data stream. Thus, the associated port count, and therefore cost and power consumption, as compared to schemes using typical transponders, is reduced, and this benefit which is even more prominent in the case of long-reach network scenarios. The Flex-Ethernet system and method according to the present principles can also adjust the rate of each constituent Flex-Ethernet signal according to their actual traffic requirements, or according to any other policy, by means of instructions sent to the transponder by a centralized controller.

As a result, optimized spectrum usage may be achieved in the case of end-to-end Ethernet optical networking, scenarios, and also to further power consumption reductions. Moreover, the software-defined control may be employed, and may reduce operational cost and complexity, while management complexity is reduced and efficiency is increased compared to the case of forming equivalently sized Ethernet Link Aggregation Groups (LAG). The system and method according to the present principles also does not add additional network layers, and hence no additional overhead is introduced, because the present principles can modify existing Ethernet protocols.

The system and method according to the present principles may transmit typical Ethernet frames over smaller bandwidth transmission pipes of adjustable granularity, thereby enabling the multiplexing of several Ethernet signals over the same line in parallel according to the actual traffic requirements of each of them. The transponder architecture according to the present principles may make use of a multi-lane approach similar to the one used in 802.3ba, and depending on its configuration, it can function either as a set of typical fixed-rate Ethernet transponders or as a set of multiple virtual flexible Ethernet (Flex-Ethernet) ones. Each of the latter virtual transponders may be considered as the one end of a Virtual Ethernet Link (VEL), while the other one may reside at a remote Flex-Ethernet transponder.

For example, in one embodiment, Client C may communicate using Ethernet both with Client D and Client B, using different VELs over the same Flex-Ethernet transponder. The transponders according to the present principles may be externally controlled by a remote controller, which may ensure that any two transponders which are interconnected (e.g., via direct point-to-point connections, or through optical devices, such as Reconfigurable Optical Add/Drop Multiplexers (ROADMs) or Optical Cross Connects (OXCs), among a plurality of others), may be configured to transmit/receive the same number of VELs with the appropriate rates assigned to each of them.

It should be understood that embodiments described herein may be entirely hardware or may include both hardware and software elements, which includes but is not limited to firmware, resident software, microcode, etc. In a preferred embodiment, the present invention is implemented in hardware.

Embodiments may include a computer program product accessible from a computer-usable or computer-readable medium providing, program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a system and method for data transport using a Flex-Ethernet transponder 100 is illustratively depicted in accordance with one embodiment of the present principles. In one embodiment, at the client side, the transponder 100 may be connected with c clients by means of transceiver modules 111, which may conform to the Ethernet standard, (e.g. C Form-factor Pluggable (CFP) ones), thus enabling the transponder 100 to connect with an client.

Each client interface may operate at a rate of $C_i$ b/s, i=1 . . . c. The supported client rates can be either of the standardized 40 Gb/s or 100 Gb/s Ethernet rates, or the rate of a possible future update of the Ethernet protocol following similar principles (e.g., 400 Gb/s and beyond). At the line side, the transponder 100 may have, for example, l interfaces with the associated optical transceiver modules 121, and each may be operating at maximum at a rate $L_i$ b/s, i−1 . . . l. The latter transceiver modules can be of an existing type but could also be based on an upcoming physical layer technology (e.g., electrical Orthogonal Frequency Division Multiplexing (OFDM), optical Nyquist Wavelength Division Multiplexing WDM)). Accordingly, on the client side the interfaces 105, 107 between the PHY module 111 and the Fixed Rate Ethernet Rx 106 and Tx 108 respectively may be standard-compliant (e.g. XLAUI/CAUI), while the equivalent interfaces on the line side may be dependent on the inputs required by a particular transceiver module 121 design. It may be assumed that the aggregate supported client capacity equals the aggregate line capacity, i.e. $\Sigma_{i=1}^{c} C_i = \Sigma_{i=1}^{l} L_i$.

In one embodiment, a key principle of the present principles is that one or more incoming Ethernet frame streams arriving to the transponder from its client side interfaces and being destined for the same output port i of maximum rate $L_i$ at the line side can be split into up to k independent streams, and each may be carried over a transmission pipe e.g., VEL) with a rate of for example, $R_{i,j}$, where it may hold that: $\Sigma_{j=1}^{k} R_{i,j} \leq L_i$.

In each of those instances, each of the transmission pipes (e.g., VELs) may use a dedicated part of the optical transceiver 121 resources for transmission/reception to/from the line side, according to their individual rates. In one embodiment, depending on the exact physical layer technology used for line side transmission, a VEL can be dropped or combined with other VELs transparently (either in the optical or the electrical domain, i.e. without the need for L2 buffering, processing and switching. Moreover, if only part of the maximum transceiver capacity $L_i$ is actually required by the traffic, then (also depending on the flexibility of the transceiver technology used at the line side) it can be operated at the line side at a lower rate, and thus save optical spectrum resources and reduce the transceiver power consumption.

The above may be achieved by, for example, turning off lasers, reducing the transceiver clock rate, or turning off parts of the transceiver digital signal processing (DSP) circuitry, among other methods. Moreover, the number of required transceivers is reduced (which can be an important cost benefit, especially in the case of long reach transmission at the line side), since statistical multiplexing is employed, acknowledging both the time varying nature of traffic between clients, but also the difficulty to foresee future traffic demands during the planning phase. The network operator has the opportunity to use the architecture according to the present principles both as a set of typical transponders, and also may create arbitrary configurations exploiting its flexibility. Finally, the novel Flex-Ethernet transponder according to the present principles may alleviate the above issues that would be incurred if creating the same variable Ethernet virtual links via the use of LAG groups.

In one embodiment, upon the arrival of an Ethernet frame from the receiving (Rx) module 102 of a client side optical transceiver and its reception by a standardized Medium Access Control (MAC)/Physical Reconciliation Sublayer (PCS) module 106 operating at rate $C_i$ (e.g., through interface 105), the frame may be directed to the correct line port by means of a Line Port Mapper module 110. The mapper 110 may process the header of each incoming Ethernet flame and may forward them to one out of l outgoing bit-serial interfaces 113 of rate $L_i$, each leading to a VEL Mapper module 114. Note that it is possible for frames originating from the same client port to be forwarded to different VEL mapper modules 114, as well as for frames originating from different client ports to be forwarded to the same VEL mapper module 114. The VEL mapper modules 114 may further separate arriving frames, and may forward them to one out of k Flex-Ethernet MAC/PCS Transmitting (Tx) Modules 116, 118, may be multiplexed in block 124, and each may be associated with a different VEL.

In one embodiment, the module corresponding to VEL j of line port i may be denoted as "Flex-Ethernet MAC/PCS Tx (i,j)". The maximum rate of each module 116, 118 may be $L_i$, which may also be the operating rate of the bit-serial interface 113. The decisions taken at modules 110 and 114 may determined by relevant forwarding tables maintained by the Local Controller 103 and may be updated according to the instructions received by the Remote Controller 101. As an example, matching criteria could be the VLAN ID field, the Destination Address field, or masked versions of them, etc.

In one embodiment, in the opposite direction from the above, an incoming signal of maximum rate $L_i$ may be received from the receiving (Rx) module 130 of a line side optical transceiver 121, and may be demultiplexed in block 126 and forwarded into one or more Flex-Ethernet MAC/PCS Rx modules 120, 122, and each may be operating at rate $R_{i,j}$, as it will be described below. The Ethernet frames received from each of those modules may then be directed to a Client Port Mapper Module 112, which may forward them to the correct client port. Note that it is possible for frames originating from the same Flex-Ethernet MAC/PCS Rx 120, 122 to be forwarded to different client ports, as well as for frames originating from different Flex-Ethernet MAC/PCS Rx 120, 122 to be forwarded to the same client port.

The operating rate of a bit-serial interface 117, 119 may be $L_i$. The client port mapper module 112 may operate similarly to the line port mapper module 110 (discussed above), and may forward frames to, for example, one of the c bit-serial interfaces 115 of rate $C_i$, leading to a standardized Ethernet MAC/PCS Tx 108. The frames may then be sent to the client via a standard-compliant PHY Module Tx 104 it is noted that the above configurations and features are illustratively depicted, other sorts of configurations and features are contemplated, and may be employed according to the present principles.

Figure 2:
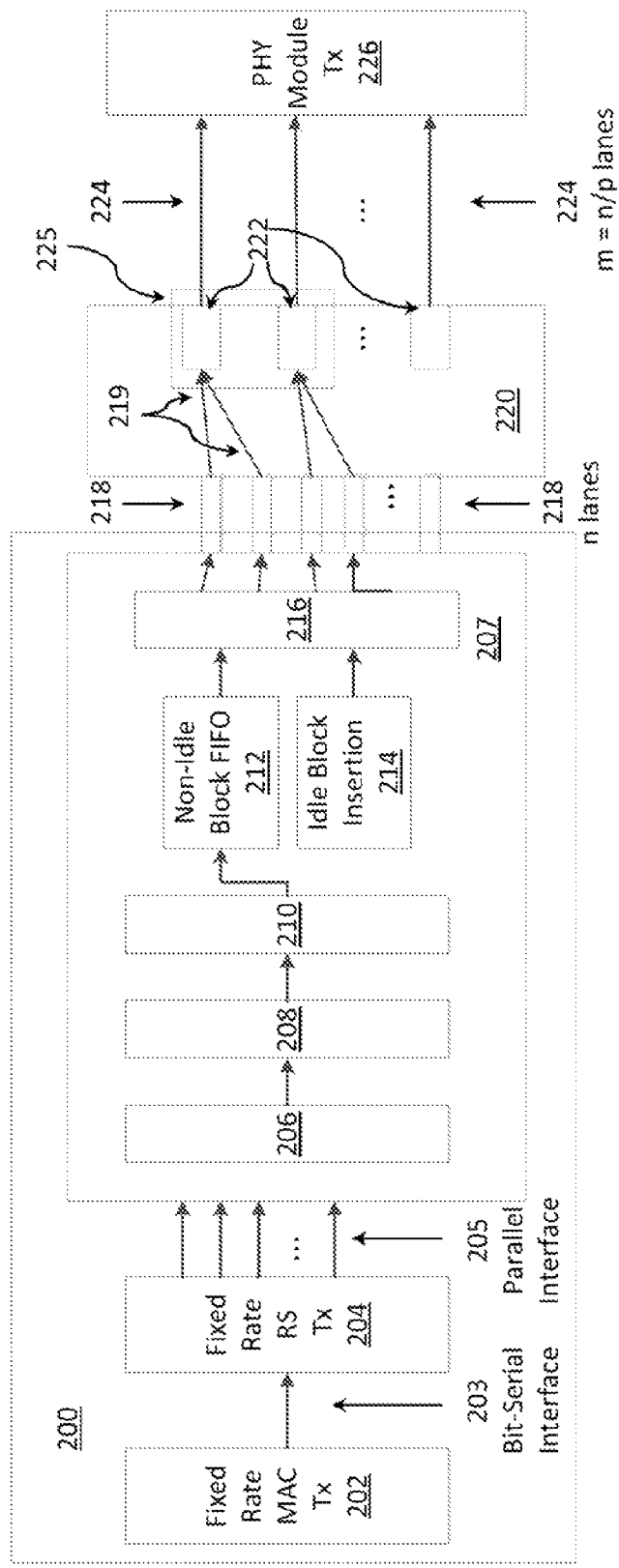
FIG. 2 is a block/flow diagram of a system and method for transmitting data in accordance with an exemplary embodiment of the present principles.

Referring now to FIG. 2, a system and method for transmitting data is illustratively depicted in accordance with an exemplary embodiment of the present principles. In one embodiment, the transmitting part of the Flex-Ethernet MAC/PCS 200 according to the present principles employs, for example, $L_i$ as a standardized Ethernet rate. The frames may be sent from the VEL Mapper 114 to a Flex-Ethernet MAC/PCS Tx module 200, and may be received by a fixed-rate MAC Tx module 202 operating at rate an aggregate rate of $L_i$. They may then be forwarded to an also fixed-rate RS Tx module 204 which may receive as input a bit-serial interface 203 and may output a bit-parallel interface 205, both at an aggregate rate of $L_i$. For example, the latter would be the XLGMII interface for $L_i$=40 Gb/s and the CGMII interface for $L_i$=100 Gb/s. In case $L_i$ is not a standardized Ethernet rate, then modules 202, 204 and interfaces 203, 205 may be customized to that non-standardized rate, but they may follow exactly the same principles as for standardized rates.

In one embodiment, the Physical Coding Sublayer (PCS) module 207 maintains part of the functionality specified in the 40G/100G Ethernet standard 802.3ba, but it may include a number of modifications. Incoming characters arriving from the parallel interface 205 may be encoded into 66-bit blocks via, for example, 64B/66B encoding in block 208 and then may be scrambled in block 210. However, before encoding and scrambling, all idle characters may be removed in block 206. At this point it should be noted that according to standard 802.3ba the RS may place idle characters only in between successive data frames. The remaining characters, which may now be encoded in block format, may be forwarded to a buffer named Non-Idle Block FIFO 212. This buffer 212 may operate in a FIFO fashion and on the basis of 66-bit blocks. The reason for the intermediate buffering is that a multi-lane scheme may be employed. In that respect, blocks created by the PCS may originally be intended to be distributed to n electrical lanes 218 in a round-robin fashion in block 216, the rate of each lane being $L_i/n$.

In one embodiment, in order to be able to produce an Ethernet signal of rate $R_{i,j} \leq L_i$, the Flex-Ethernet scheme according to the present principles uses round-robin distribution, but only among $\alpha_{i,j}$ lanes which are considered as the "active" lanes. It will hold that: $\Sigma_{j=1}^{k} \alpha_{i,j} \leq n$. The present principles may take advantage of the existing idle characters, and eliminate them, so that only useful blocks are presented to the $\alpha_{i,j}$ active lanes, wherein useful blocks are blocks which do not include idle characters. At the same time, an additional Idle Block insertion Module 214 may ensure that whenever there are no blocks waiting in buffer 212, the round-robin distribution mechanism 216 will be fed with "idle blocks" (e.g., blocks comprising idle characters only). This is, for example, is expected to take place when longer inter-frame gaps appear as a result of the actual traffic rate being lower than $R_{i,j}$. It should be noted that the idle blocks inserted in block 214 may be provided in scrambled form.

As mentioned already, each of the Flex-Ethernet MAC/PCS Tx Modules 200 may receive input at a rate of $L_i$, and outputs at rate $R_{i,j} \leq L_i$. It is therefore assumed that traffic destined for each VEL and handled by MAC/PCS Tx (i,j) is already shaped at the client side to ensure that its average rate will not exceed $R_{i,j}$ when averaged at a burst duration longer than a given value b. Any shaping mechanism known in the art (e.g., the token bucket scheme), can be employed to achieve this result. The aforementioned shaping assumption ensures that the maximum required size for buffer 212 to ensure lossless operation is deterministic. In other words, enough idle characters are guaranteed to be received during the buffer duration timeframe to allow correct operation using a lower number of the output PCS lanes 218.

In one embodiment, for the round-robin distribution 216, alignment markers may be used and depending on the number of active lanes, a smaller lane marker count (ranging from 0 to $\alpha_{i,j}-1$) is employed. The same lane marker range can be used by the different Flex-Ethernet PCS modules sharing the same line port, since the Physical Medium Attachment (PMA) 220 may ensure that the respective output lanes 218 of the PCS module 200 may be directed to in separate input lanes 224 of the PHY Module Tx 226. For example, the lanes corresponding to those in block 225 may include data originating only from Flex-Ethernet MAC/PCS Tx (1,1) 200. In one embodiment, the PMA with Lane Multiplexing module 220 may make the appropriate cross-connections between sets of p consecutive input interfaces 219 and the associated single output interfaces 225, each one leading to one out of the m lanes 224 via intermediate p: 1 bit multiplexers 222. The multiplexing ratio parameter p may be determined by the respective lane counts as p=n/m.

Figure 3:
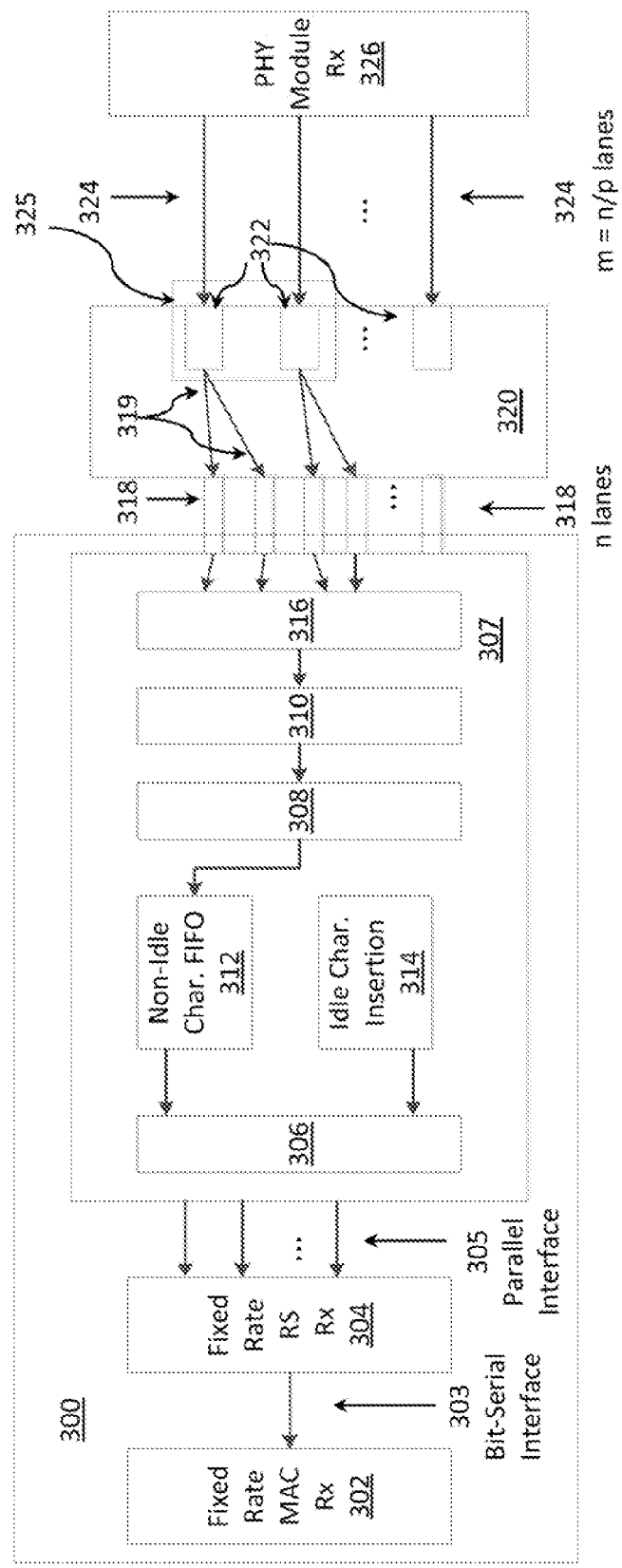
FIG. 3 is a block/flow diagram of a system and method for receiving data in accordance with an exemplary embodiment of the present principles.

Referring now to FIG. 3, a system and method for receiving data is illustratively depicted in accordance with an exemplary embodiment of the present principles. In one embodiment, the receiving part of the Flex-Ethernet MAC/PCS 300 according to the present principles is associated with a number of active output lanes 325 which is a subset of the n/p lanes 324 of the PHY Module Rx 326, and signals at each lane 325 may be bit-demultiplexed in blocks 322 by the PMA module 320 into p bit streams which are then directed to $\alpha_{i,j}$ output interfaces 319, which in turn may lead to the appropriate active PMA output lanes 318.

In one embodiment, lane reordering and de-skewing 316 may be performed by the PCS 307, but only among the lanes belonging to the same Flex-Ethernet MAC/PCS Rx. Incoming blocks may be descrambled in block 310 and decoded in block 308, and the resulting characters may be inserted in a buffer. Since blocks 302 and 304, and interfaces 303 and 305 may operate at rate $L_i \geq R_{i,j}$, an Idle Character Insertion Module 314 may be employed to insert idle characters for maintaining the rate of $L_i$. "Start" and "terminate" characters may be identified by a Character Combiner Module 306, so that the inserted idle characters are placed only between successive Ethernet frames, as required by the RS.

The resulting bit-serial output of rate $L_i$ may be converted, to parallel 305 for providing output to a fixed-rate RS Rx Module 304. This module 304 in turn may output using a bit-serial interface 303 at rate $L_i$ to a fixed-rate MAC Rx module 302, also operating at rate $L_i$. As described above, the corresponding frames may then be forwarded to the client side by means of the Client Port mapper 112 and the corresponding bit-serial interfaces 121, both operating at rate $C_i$. It is noted that although the above configurations have been illustratively depicted, it is contemplated that other sorts of configurations may also be employed according to the present principles.

Figure 4:
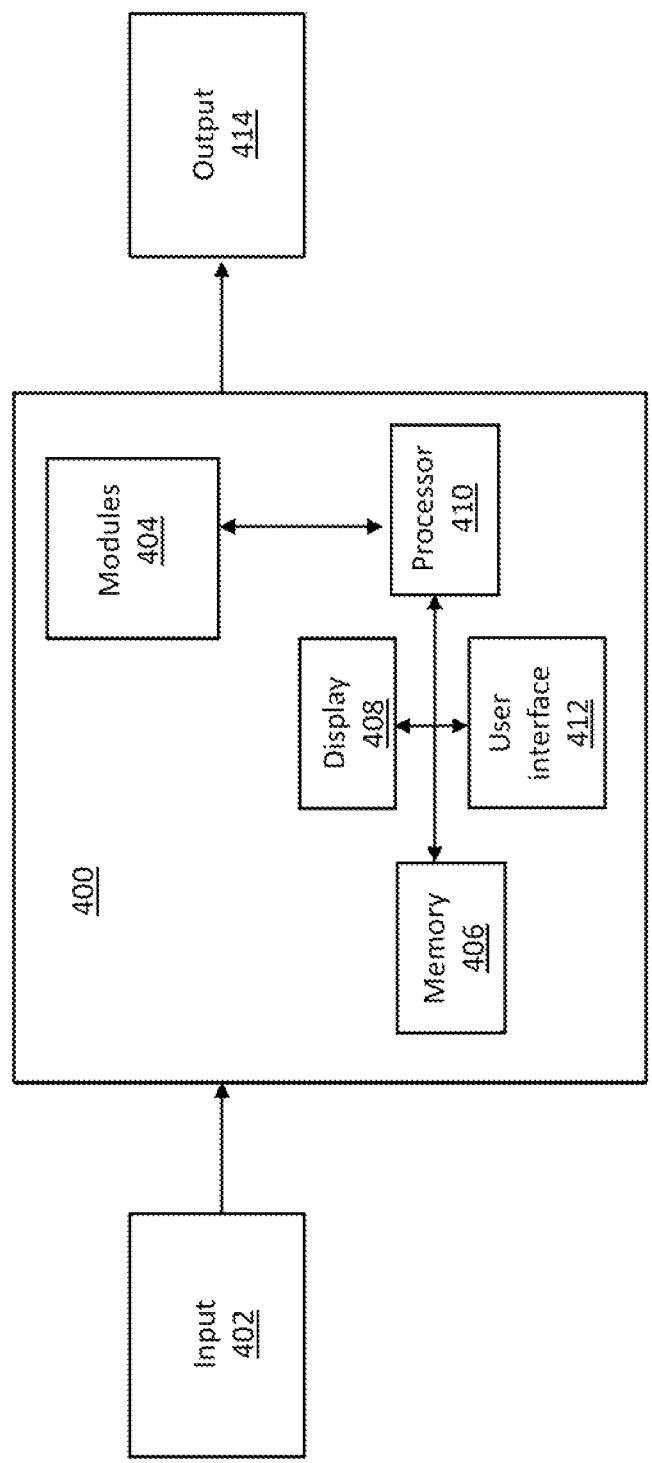
FIG. 4 is a high level block/flow diagram of a system for data transport in accordance with an exemplary embodiment of the present principles.

Referring to FIG. 4, a high level block/flow diagram of a system and method for data transport 400 is illustratively depicted in accordance with an exemplary embodiment of the present principles. In one embodiment, the system 400 includes one or more processors 410 and memory 406 for storing applications, modules and other data. The system 400 may include one or more displays 408 for viewing. The displays 408 may permit a user to interact with the system 400 and its components and functions. This may be further facilitated by a user interface 412, which may include a mouse, joystick, or any other peripheral or control to permit user interaction with the system 400 and/or its devices. It should be understood that the components and functions of the system 400 may be integrated into one or more systems or workstations.

The system 400 may receive input data 402 which may be employed as input to a plurality of modules 404 which may be configured to perform a plurality of tasks. The system 400 may produce output data 414, which in one embodiment may be displayed on one or more display devices 408. It should be noted that while the above configuration is illustratively depicted, it is contemplated that other sons of configurations may also be employed according to the present principles.

Figure 5:
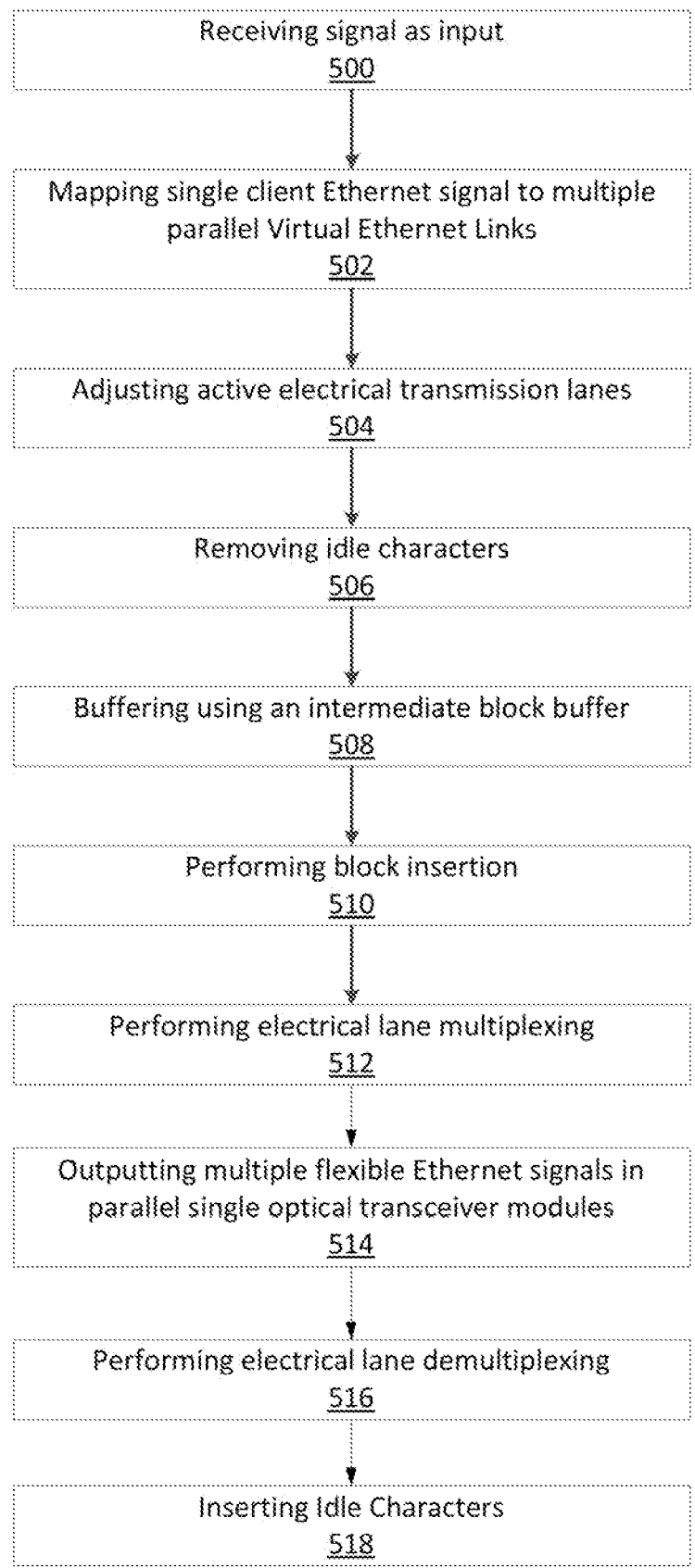
FIG. 5 is a flow diagram of a system and method for data transport in accordance with an exemplary embodiment of the present principles.

Referring now to FIG. 5, a flow diagram of a system and method for data transport is illustratively depicted in accordance with an exemplary embodiment of the present principles. In one embodiment, one or more signals may be received as input in block 500, and a single client Ethernet signal may be mapped to multiple parallel Virtual Ethernet Links (VELs) in block 502. A number of active electrical transmission lanes may be adjusted in block 504, and idle characters may be removed in block 506. An intermediate block buffer may be employed in block 508, and idle block insertion may be performed in block 510. Electrical lane multiplexing may occur in block 512, multiple flexible Ethernet signals may be output in parallel single optical transceiver modules in block 514, and electrical lane demultiplexing by the receiver may occur in block 516.

In one embodiment, an intermediate character buffer may be employed after block 514, and idle character insertion may occur in block 516. It is noted that the control of the transponder parameters may be by a remote controller and/or a local controller according to the present principles. The system and method according to the present principles may achieve software-defined transmission of multiple flexible Ethernet signals in parallel single optical transceiver modules, thereby achieving increased spectral and energy efficiency while also achieving cost savings and simplified management at the same time. It is noted that in one embodiment, steps 500 through 514 may be performed by a transmitter while steps 516 through 518 may be performed by a receiver.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for data transport, comprising:
receiving one or more signals into a reconfigurable and flexible rate shared rate multi-transponder network architecture, wherein the network architecture includes one or more transponders with multiple line side interfaces and one or more client side interfaces, the one or more transponders configured to:
map one or more signals to multiple parallel Virtual Ethernet Links;
remove idle characters from the one or more signals;
buffer one or more blocks of characters using an intermediate block buffer;
activate and deactivate one or more portions of input/output electrical lanes of an Ethernet module processing one or more incoming Ethernet frame streams arriving at a transponder from client side interfaces and destined for the same output port i with maximum rate $L_i$ at a line side and split into up to k independent streams, and each is carried over a transmission pipe with a rate $R_{ij}$, where $\Sigma_{j=1}^{k} R^{i,j} \leq L_i$,
multiplex and demultiplex the one or more signals to and from the input/output electrical lanes to enable sharing of a single optical transceiver by multiple independent signals, the multiple independent signals being multiplexed and demultiplexed in parallel according to actual traffic demands for each of the multiple independent signals; and
insert blocks of idle characters into the one or more signals to enable transmission over a lower rate transmission pipe.

2. The method as recited in claim 1, wherein the one or more signals are single client Ethernet signals.

3. The method as recited in claim 1, wherein only active lanes of the input/output electrical lanes are enabled.

4. The method as recited in claim 1, wherein the one or more transponders are further configured to map Ethernet frames arriving from the multiple line side interfaces to a configurable number of Ethernet signals of adjustable rate towards the one or more client side interfaces.

5. The method as recited in claim 1, wherein the one or more transponders is further configured to map Ethernet frames arriving from each of the one or more client side interfaces to a configurable number of Ethernet signals of adjustable rate towards the multiple line side interfaces.

6. The method as recited in claim 1, wherein parameters of the one or more transponders are controlled by a remote controller.

7. The method as recited in claim 1, wherein the one or more transponders are configured to insert idle characters into an Ethernet signal at the Physical Coding Sublayer to enable data transmission by higher rate sublayers.

8. A transmitter, comprising:
one or more transponders in a reconfigurable and flexible rate shared rate multi-transponder network architecture, wherein the one or more transponders include multiple line side interfaces and one or more client side interfaces, the one or more transponders further comprising:

one or more mappers configured to map one or more signals arriving from each of the one or more client side interfaces to a configurable number of adjustable rate Ethernet signals towards the multiple line side interfaces, wherein a single optical transceiver module is shared toward the multiple line side interfaces by multiple Ethernet signals in parallel, the multiple Ethernet signals each including traffic from a different client data stream where incoming Ethernet fame streams arrive at a transponder from client side interfaces and are destined for the same output port i with maximum rate $L_i$ at a line side and split into up to k independent streams, and each is carried over a transmission pipe with a rate $R_{ij}$, where $\Sigma_{j=1}^{k} R_{i,j} \leq L_i$;

one or more bit-serial interfaces to receive input, and one or more parallel serial interfaces to send output to one or more electrical lanes;

an idle character removal module configured to remove existing idle characters from the Ethernet signals, and to send only useful blocks to active lanes in the one or more electrical lanes, wherein the useful blocks are blocks with no idle characters;

a buffer configured to distribute blocks of data in a round robin fashion, the buffer including an idle block insertion module configured to insert idle blocks when there are no blocks waiting in the buffer; and one or more scramblers or encoders configured to scramble or encode the one or more signals before transmitting.

9. The transmitter as recited in claim 8, wherein the one or more mappers are Virtual Ethernet Link mappers.

10. The transmitter as recited in claim 8, wherein the one or more signals are single client Ethernet signals.

11. The transmitter as recited in claim 8, wherein only active lanes of the one or more electrical lanes are enabled.

12. The transmitter as recited in claim 8, wherein the one or more transponders are further configured to map Ethernet frames arriving from each of the one or more client side interfaces to a configurable number of Ethernet signals of adjustable rate towards the multiple line side interfaces.

13. The transmitter as recited in claim 8, wherein parameters of the one or more transponders are controlled by a remote controller.

14. A receiver, comprising:

one or more transponders in a reconfigurable and flexible rate shared rate multi-transponder network architecture, wherein the one or more transponders includes multiple line side interfaces and one or more client side interfaces, the one or more transponders further comprising:

a receiving module configured to receive one or more signals using active lanes from one or more electrical lanes;

one or more demultiplexers configured to demultiplex the one or more signals, the one or more signals being multiplexed and demultiplexed in parallel according to actual traffic demands for each of the one of more signals;

one or more descramblers or decoders configured to descramble or decode the one or more signals; and a buffer configured to receive descrambled or decoded signals, the buffer including a character insertion module configured to insert characters between successive Ethernet frames to maintain a transport rate and wherein one or more incoming Ethernet frame streams arrive at a transponder from client side interfaces and destined for the same output port i maximum rate $L_i$ at a line side and split into up to k independent streams, and each is carried over a transmission pipe with a rate $R_{ij}$, where $\Sigma_{j=1}^{k} R^{i,j} \leq L_i$.

15. The receiver as recited in claim 14, wherein the one or more signals are single client Ethernet signals.

16. The receiver as recited in claim 14, wherein the one or more transponders is further configured to map Ethernet frames arriving from each of the one or more client side interfaces to a configurable number of Ethernet signals of adjustable rate towards the multiple line side interfaces.

17. The receiver as recited in claim 14, wherein parameters of the one or more transponders are controlled by a remote controller.

* * * * *